United States Patent
Meskanen et al.

(10) Patent No.: US 9,972,198 B2
(45) Date of Patent: May 15, 2018

(54) METHOD FOR LAUNCHING AND A RADIOSONDE

(75) Inventors: Ari Meskanen, Helsinki (FI); Pasi Makinen, Helsinki (FI); Mikko Krapu, Helsinki (FI)

(73) Assignee: Vaisala Oyj, Helsinki (FI)

( * ) Notice: Subject to any disclaimer, the term of this patent is extended or adjusted under 35 U.S.C. 154(b) by 246 days.

(21) Appl. No.: 13/811,852

(22) PCT Filed: Mar. 22, 2011

(86) PCT No.: PCT/FI2011/050242
§ 371 (c)(1),
(2), (4) Date: Feb. 11, 2013

(87) PCT Pub. No.: WO2012/127096
PCT Pub. Date: Sep. 27, 2012

(65) Prior Publication Data
US 2013/0141248 A1    Jun. 6, 2013

(51) Int. Cl.
G08C 17/00    (2006.01)
G08C 17/02    (2006.01)
G01W 1/08    (2006.01)

(52) U.S. Cl.
CPC ............... *G08C 17/02* (2013.01); *G01W 1/08* (2013.01)

(58) Field of Classification Search
CPC ...................................................... G08C 17/02
USPC ...................................................... 340/870.1
See application file for complete search history.

(56) References Cited

U.S. PATENT DOCUMENTS

| | | | | |
|---|---|---|---|---|
| 5,173,690 A | * | 12/1992 | Friedman | G01S 11/026 |
| | | | | 340/870.1 |
| 5,186,418 A | * | 2/1993 | Lauritsen | B64D 1/00 |
| | | | | 102/387 |
| 5,548,283 A | | 8/1996 | Martin | |
| 6,421,010 B1 | * | 7/2002 | Chadwick et al. | 342/465 |
| 2007/0027624 A1 | * | 2/2007 | Powe et al. | 701/213 |

FOREIGN PATENT DOCUMENTS

| | | |
|---|---|---|
| DE | 20 2004 005 530 U1 | 8/2004 |
| KR | 10-2008-0024612 A | 3/2008 |
| KR | 20080024612 A * | 3/2008 ............ 342/465 |

* cited by examiner

Primary Examiner — Amine Benlagsir
(74) Attorney, Agent, or Firm — Seppo Laine Oy

(57) ABSTRACT

A method and a radiosonde wherein the radiosonde is launched from a launching station and transmission of the radiosonde is started in order to send measurement data to a receiver. The transmission of the radiosonde is started only after a delay from the launch.

17 Claims, 2 Drawing Sheets

METHOD FOR LAUNCHING AND A RADIOSONDE

The present invention relates to a method for launching radiosondes according to the preamble of claim 1.

The invention also relates to a radiosonde.

A radiosonde (also called a sounding device) is typically a weather observation device, which is attached to a gas balloon, measures atmospheric parameters and sends the measurement information typically to a ground based station. Measured or calculated parameters typically include atmospheric temperature, pressure, and humidity, as well wind speed and direction, at various altitudes.

Defense forces use radiosondes for various purposes. The atmospheric profile obtained with radiosondes is particularly important for ballistic preparation, and it is also used e.g. for aviation, naval applications and as an input into numerical weather prediction models. In the prior art these radiosondes and especially their radio systems are activated prior to or at launch such that radiosondes start immediately transmitting information to the launching station.

This technology makes it easily possible for an other party, such as a foreign army, to locate the launching station and start military actions against the launching station.

Additionally the radio transmission of the radiosonde disturbs other radio transmissions in the close vicinity. This is problem has increased lately when the air is full of radio transmission in various frequencies due to large number of mobile radio units like mobile telephones, computers etc.

The invention is intended to eliminate at least some of the shortcomings defects of the state of the art disclosed above and for this purpose create an entirely new type of method for launching radiosondes and a radiosonde.

The invention is based on starting the radio transmission of the radiosonde after a delay after the launch and advantageously buffering the measurement information between the launch and start of the transmission.

More specifically, the method according to the invention is characterized by what is stated in the characterizing portion of claim 1.

The apparatus according to the invention is, in turn, characterized by what is stated in the characterizing portion of claim 13.

Considerable advantages are gained with the aid of the invention.

With help of the invention the launch site may not be detected by the other parties. In accordance with a preferred embodiment of the invention, no measurement information will be lost because of the buffering and delayed transmission of the measurement data.

In connection with ground based operations electromagnetic disturbances to other parties may be eliminated especially close to the ground where the number of radio devices is greatest.

In the following, the invention is examined with the aid of examples and with reference to the accompanying drawings.

Figure 1:
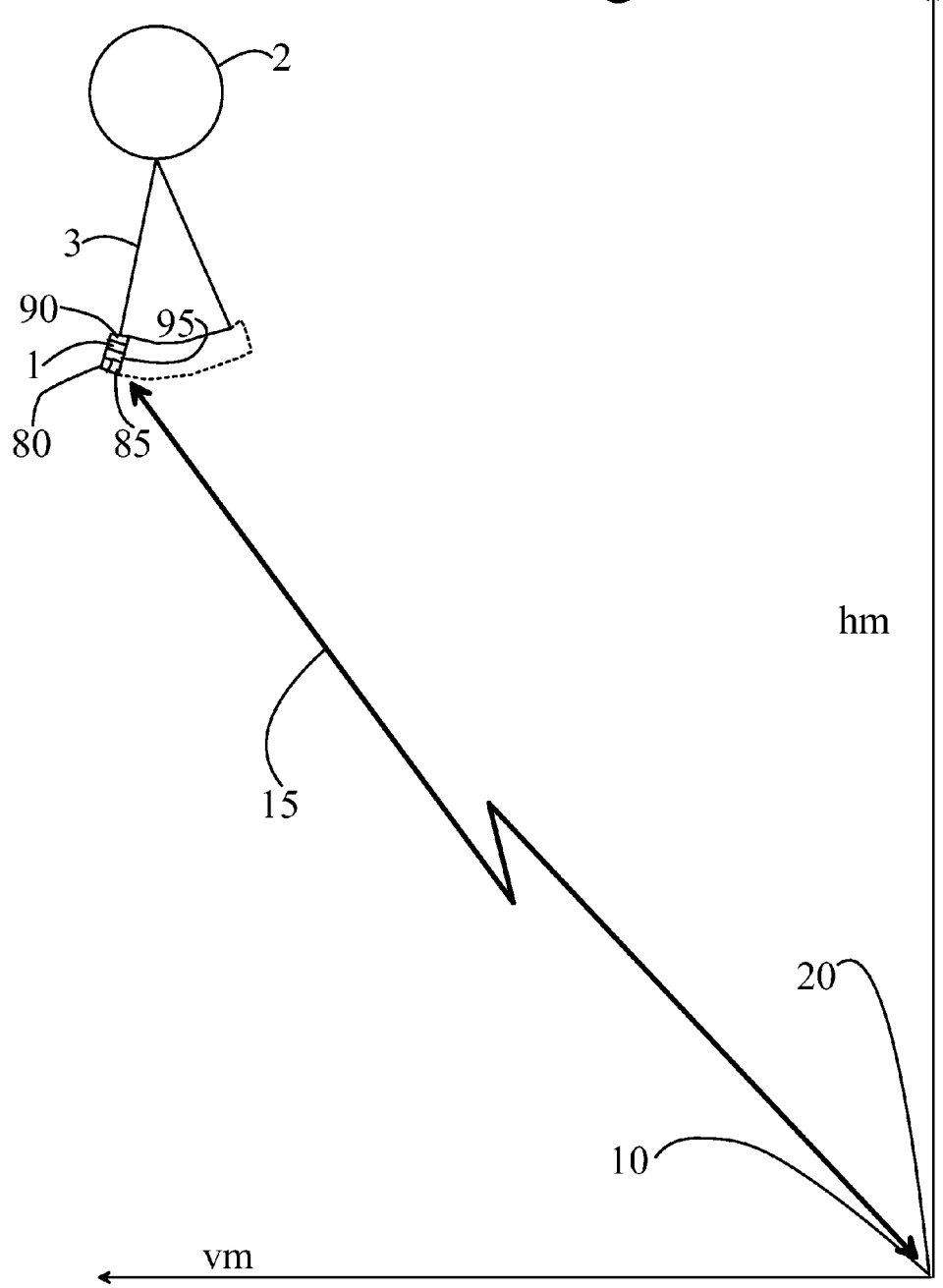
FIG. 1 shows schematically a radiosonde launched some time ago from a launching device suitable for the invention.

In FIG. 1, the radiosonde 1 has been launched from a launching station 10 some time ago. The radiosonde 1 is attached to the balloon 2 by a cord 3. The motion of the radiosonde 1 is formed of a vertical motion vm and a horizontal motion hm, as well as of a pendulum motion, which causes the radiosonde 1 to swing at the end of the cord 3. The rate of ascent of a radiosonde typically varies between 4 and 7 m/s and the lateral velocity of the radiosonde typically varies between 0 and 20 m/s at launch and after launch in range of 0-80 m/s. The radiosonde 1 typically includes a battery 80, measurement electronics 85, a transmitter 90 and a memory 95.

The radiosonde 1 sends 15 the measurement information to the launching station in accordance with the invention after a delay after launch and the delay may be e.g. 60-1000 seconds and this means that the radiosonde 1 will be at about 300-5000 m altitude when the transmission 15 to the launching station 10 from the transmitter 90 to the receiver 20 starts. The transmission delay may vary for example randomly within predefined limits in order to make the estimation of the location of the launching device more difficult for other parties. The radio silence (=delay) may vary in range of 30-3000 seconds. The transmitter 90 may be triggered on by altitude information, e.g. from pressure sensor or GPS-receiver or alternatively temperature information may be used to trigger the transmitter 90 on. In practice the launching station 10 typically includes the receiver 20 but the invention is not limited to this solution as we in the following embodiments will explain in more detail.

The radiosonde 1 starts typically measuring atmospherical parameters immediately after launch and in accordance with the invention the measurement data will be buffered into the internal memory 95 of the radiosonde 1. The memory should be sufficient to store the measurement data of maximum delay, e.g. 3000 seconds.

When the transmission 15 is started the radiosonde 1 sends the buffered measurement data from the memory 95 with help of the transmitter 90 to the receiver 20 of the launching device 10. The receiver may also be located outside the launching device 10. By present technology, there is about 50% free capacity available with the standard telecommunications between the radiosonde 1 and the receiver 20. Therefore, without essential amendments the transmitter 90 of the radiosonde may be silent about 50% of the active flight time and when activated send buffered and real time measurement data with full transmission capacity for the rest of the radiosonde flight time. The buffered data can be transmitted e.g. interlaced with real time data.

Of course with increased transmission capacity by reserving more bandwidth for the transmission, the silent time of the transmitter 90 may be increased essentially. Then, however, also the transmission power and typically also battery capacity must be increased. The transmission is advantageously encrypted.

Figure 2:
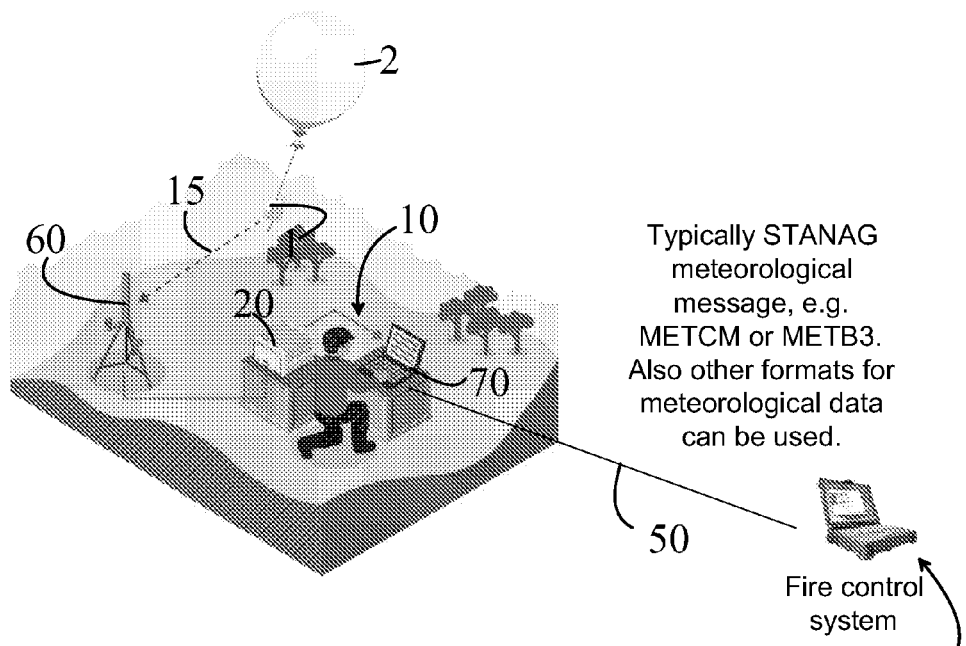
FIG. 2 shows schematically one embodiment in accordance with the prior art.

In accordance with FIG. 2 in field conditions the launcher 10 does not need to be an automatic launcher but it can be operated by a man and the balloons 2 may be inflated manually. Also in field conditions an antenna 60 of the launcher unit 10 may be a light weight tripod connected to the receiver 20. The information from the receiver is typically output to a computer 70 having a suitable program for converting the measurement information to a suitable transmission protocol and into a suitable format like METCM, STANAG 4082 Standard Artillery Computer Meteorological Message or METB2/METB3, STANAG 4061 Standard Ballistic Meteorological Message, to be sent further to unit 30 for further use like for fire control in military solutions.

Figure 3:
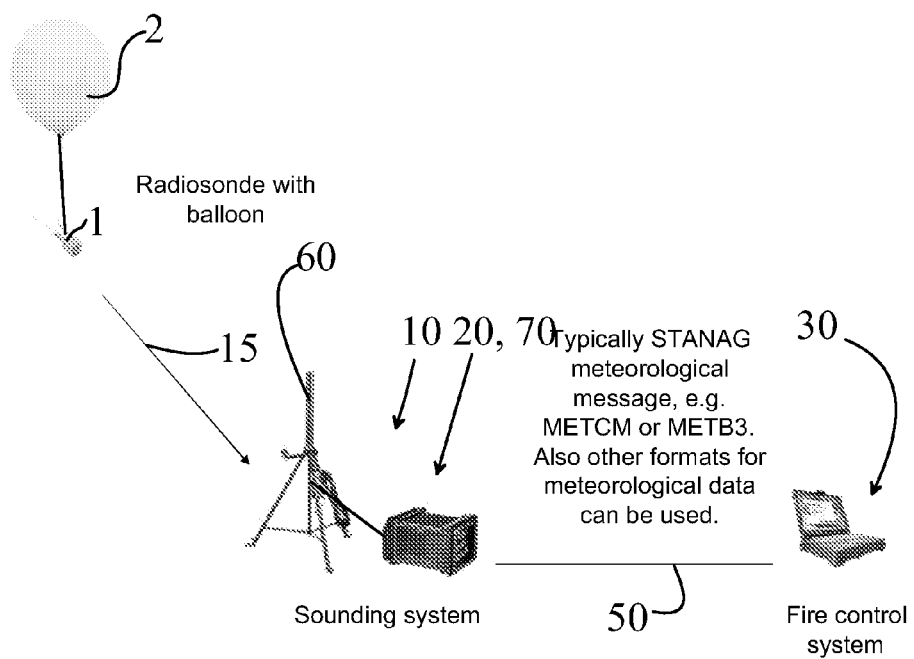
FIG. 3 shows schematically second embodiment of the invention.

FIG. 3 shows an alternative solution where the receiver 20 and the computer 70 are integrated into the same unit. A system of FIG. 3 may easily be installed in a mobile unit like a ground vehicle or a sea vehicle in order to increase mobility of the launching unit 10.

The invention is also suitable for dropsondes. A drop sonde is a weather observation device like a radio sonde, but instead of being lifted by a gas balloon it is deployed from a flying system, typically an aircraft, Unmanned Aircraft System (UAS) or a driftballoon. The launching device, and typically but not necessarily also the receiver, are located onboard the flying system.

The satellite navigation system for measuring location may be in accordance with the invention e.g. GPS-system, Galileo, BeiDou or any other satellite based navigation system.

The invention claimed is:

1. A method for launching a radiosonde from a launching station and concealing the launching station comprising the following steps:
   said launching the radiosonde from the launching station, and
   after a predefined radio silence, comprising a pre-set elapsed time, starting a transmission of the radiosonde in order to send measurement data to a receiver connected to the launching station,
   wherein
   the measurement data is gathered by measurement electronics and buffered into a memory of the radiosonde during a time between the launching of the radiosonde from the launching station and an initial starting of the transmission of the measurement data of the radiosonde.

2. The method according to claim 1, wherein the predefined radio silence is 30-3000 seconds from launch.

3. The method according to claim 1, wherein the predefined radio silence is of random length within a predefined range.

4. The method according to claim 1, wherein the measurement data is sent from the radiosonde to a launching station.

5. The method according to claim 1, wherein the radiosonde is launched from a stationary ground launcher.

6. The method according to claim 1, wherein the radiosonde is launched from a ship.

7. The method according to claim 1, wherein the radiosonde is launched from a mobile vehicle, including a car, a truck, or a train.

8. The method according to claim 1, wherein the transmission is encrypted.

9. The method of claim 1, wherein the predefined radio silence is sufficient to inhibit a detection of the launching station.

10. A radiosonde comprising:
    a battery,
    measurement electronics supplied by the battery, and
    a transmitter supplied by the battery, wherein
    the radiosonde is configured to start transmission of measurement data from the transmitter to a receiver connected to a launching station only after a predefined radio silence comprising a pre-set elapsed time from launch of the radiosonde, and
    a memory unit operationally associated with the radiosonde is provided for storing the measurement data gathered by the measurement electronics and buffered into the memory unit during a time between the launch of the radiosonde from the launching station and an initial starting of the transmission of the measurement data of the radiosonde.

11. The radiosonde according to claim 10, wherein said radiosonde determines an altitude of the radiosonde.

12. The radiosonde according to claim 11, wherein said radiosonde further contains a pressure sensor for determining the altitude of the radiosonde.

13. The radiosonde according to claim 12, wherein said radiosonde further contains a satellite navigation receiver for determining the altitude of the radiosonde.

14. The radiosonde according to claim 13, wherein said radiosonde further contains a locator for determining a location of the radiosonde.

15. The radiosonde according to claim 14, wherein the locator for determining the location of the radiosonde is a satellite navigation receiver.

16. The radiosonde according to claim 10, and further including a balloon for lifting the radiosonde into the atmosphere.

17. The radiosonde according to claim 10 further comprising a buffer for storing of the measurement data collected between the launch of the radiosonde and the start of the transmission of the measurement data.

* * * * *